Patented Apr. 24, 1945

2,374,484

UNITED STATES PATENT OFFICE 2,374,484

ESTERS OF NITROHYDROXY COMPOUNDS

Henry B. Haas, West Lafayette, Ind., and Byron M. Vanderbilt, Baton Rouge, La., assignors to Purdue Research Foundation, Lafayette, Ind., a corporation of Indiana No Drawing. Application March 15, 1943, Serial No. 479,262

2 Claims. (Cl. 260—488)

Our invention relates to new and useful esters of nitrohydroxy compounds. More specifically our invention relates to the esters produced by the action of aliphatic acids or the anhydrides thereof on nitroglycols.

The esters of the nitroglycols of our invention may be represented by the following generic formula:

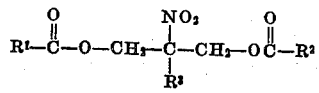

wherein $R^1$ and $R^2$ are either hydrogen or alkyl, and $R^3$ is an alkyl group having from two to three carbon atoms. As examples of esters which may be included within the scope of our invention, there may be mentioned the aliphatic monocarboxylic esters of 2-nitro-2-ethyl-1,3-propanediol, 2-nitro-2-isopropyl-1,3-propanediol, 2-nitro-2-propyl-1,3-propanediol, and the like. More specifically, these esters may be represented by the following structural formulas:

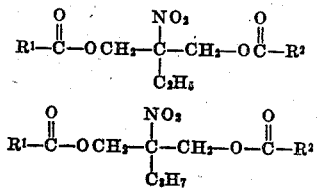

in which $R^1$ and $R^2$ represent hydrogen or an alkyl group.

The esters of our invention may be prepared by reacting the corresponding nitroglycol with the desired aliphatic acid or anhydride thereof. When the anhydride is used in carrying out this procedure, it is preferably added slowly to the nitroglycol, which contains a small amount of a mineral acid catalyst, such as hydrochloric, sulfuric, or phosphoric acids. After the anhydride has been added, the reaction mixture is heated, under reflux, at a temperature of from 80–100° C., until the reaction is substantially complete, as may be evidenced by the constant boiling point of the crude mixture. If an acid is employed in the preparation of the nitroglycol esters of our invention, the same procedure may be utilized as described above, with the exception that the entire quantity of said acid may be added at once to the nitroglycol. The product thus obtained may then be separated from the remaining organic acid by means of distillation under reduced pressure. The mineral acid catalyst, if desired, may be removed from the reaction mixture either by adding a substance such as hydrated lime, which will form an insoluble compound therewith, or said catalyst may be satisfactorily removed by treatment with water. On the other hand, it is sometimes desirable to distill the ester directly from the acid medium since we have found that on certain occasions attempts to neutralize the acid catalyst or to remove it by washing, have resulted in substantially lower yields than those which can be obtained by distilling the ester directly from the acid medium. Whether or not the acid catalyst is removed prior to vacuum distillation from the crude ester is immaterial, however, to the subsequent steps of purification since the distillate obtained thereby is washed with a dilute solution of an alkaline substance such as sodium bicarbonate, after which it may again be treated with water to insure the absence of acids or other undesirable materials therefrom. The esters obtained in this manner are ordinarily suitable for technical use. However, they may be further purified by subjecting the same to an additional fractional vacuum distillation treatment.

As examples of acids which can be utilized in the preparation of the esters of my invention, there may be mentioned propionic acid, butyric acid, isobutyric acid, valeric acid, caproic acid, lauric acid, palmitic acid, stearic acid, and the like. In addition, anhydrides of the acids of the above-mentioned type may also be employed in the production of these new esters, and it is to be understood that said acids and anhydrides function as equivalents in my process. The anhydrides applicable to my invention comprise a wide range of compounds of which the following may be mentioned by way of illustration: propionic anhydride, butyric anhydride, isobutyric anhydride, valeric anhydride, caproic anhydride, and the like.

The nitroglycols employed in the production of these esters may be prepared in accordance with any procedure known to the art. However, we prefer to employ the method described in United States Patent No. 2,139,120 by Henry B. Hass and Byron M. Vanderbilt. According to this procedure nitroglycols may be prepared by reacting an aliphatic aldehyde with a primary nitro-paraffin in a molecular ratio of 2 moles of aldehyde to one of nitroparaffin in the presence of an alkaline earth metal hydroxide, such as calcium hydroxide, at a temperature preferably between 25–60° C. The aldehyde is added slowly to the nitroparaffin with constant agitation, external cooling being employed, if necessary. If desired, auxiliary solvents such as methyl or ethyl alcohol may be utilized.

Our invention may be further illustrated by the following specific examples:

Example I 2-nitro-2-propyl-1,3-propanediol dibutyrate was prepared by reacting 152 parts by weight of 2-nitro-2-propyl-1,3-propanediol and 0.5 part by weight of concentrated sulfuric acid, with 182 parts by weight of butyric acid. After this mixture had been maintained at a temperature of from 80–90° C., for a period of one hour, the excess butyric acid was removed therefrom in the form of a constant boiling mixture with the water, which was produced during the esterification, by means of distillation under reduced pressure. A quantity of hydrated lime, equivalent to the sulfuric acid present, was then added and the crude product distilled under high vacuum. The resulting distillate was washed with dilute bicarbonate solution, washed with water until neutral, and again distilled. The product thus obtained boiling at 160° C. (4 mm.) was a clear, slightly viscous liquid possessing a pleasant odor.

Example II 2-ethyl-2-nitro-1,3-propanediol dibutyrate was prepared in accordance with the procedure described in Example I, and was obtained in 89% yield. This product, a water-white liquid, boiling at 174° C. (8 mm.), was found to be soluble in the common organic solvents, including petroleum naphthas.

Example III 2-ethyl-2-nitro-1,3-propanediol diacetate was prepared by slowly adding 650 parts by weight of acetic anhydride to 447 parts by weight of 2-ethyl-2-nitro-1,3-propanediol containing 1 part by weight of concentrated sulfuric acid. When the entire quantity of the acetic anhydride had been added, the reaction was found to be substantially complete. The acetic acid, formed during the esterification, was then removed by subjecting the mixture to vacuum distillation, after which the residue resulting was washed twice with water, the ester layer separated therefrom, and the purified ester obtained by subjecting the contents of said ester layer to distillation under reduced pressure. This compound possessed the following physical properties: boiling point, 145° (10 mm.); refractive index $n_D^{20}$, 1.444; specific gr. $d_4^{25}$, 1.1718.

The esters of our invention prepared from the lower aliphatic acids are in general clear liquids with a weak but characteristic ester-like odor and, in general, are relatively thermostable compounds; while those synthesized from the higher fatty acids are ordinarily white wax-like solids soluble in benzene and petroleum ether. Although the physical properties mentioned in the above examples will be helpful in the identification of such products, we do not desire to be restricted to compounds having the properties disclosed, since these data were taken from single preparations and are therefore not to be interpreted as being strictly representative.

The esters of our invention are useful as organic solvents and have been found to possess plasticizing properties when incorporated in certain cellulose derivative compositions. These compounds may also be found to be useful in the synthesis of numerous organic materials. Additional uses will be apparent to those skilled in the art.

This is a continuation-in-part of our copending application U. S. Serial No. 340,244, filed June 13, 1940.

Our invention now having been described, what we claim is:

1. A nitroglycol ester having the following structural formula:

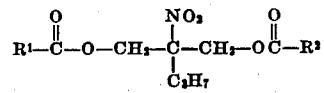

wherein $R^1$ and $R^2$ are members of the group consisting of hydrogen and alkyl.

2. 2-nitro-2-propyl-1,3-propanediol dibutyrate.

HENRY B. HASS.
BYRON M. VANDERBILT.